UNITED STATES PATENT OFFICE.

HORACE N. WHEELER, OF MYSTIC RIVER, ASSIGNOR OF TWO-THIRDS TO FRANK A. COATES AND BENJN. L. HOLMES, BOTH OF MYSTIC BRIDGE, CONNECTICUT.

COMPOSITION FOR CLEANING AND POLISHING HARNESS.

SPECIFICATION forming part of Letters Patent No. 249,432, dated November 8, 1881.

Application filed September 27, 1881. (No specimens.)

*To all whom it may concern:*

Be it known that I, HORACE N. WHEELER, a citizen of the United States, residing at Mystic River, in the county of New London and State of Connecticut, have invented a new and useful Composition of Matter to be Used in Cleaning and Polishing Harness, of which the following is a specification.

My composition consists of the following ingredients, combined in the proportions stated, viz: pure water, four gallons; caustic soda, four pounds; olive-oil, twenty pounds; drop-black, three pounds; gum-shellac, one and one-half pound. The soda should first be dissolved in half of the water, which should be boiling. After the soda is thus dissolved the shellac should be added and the mixture stirred until it is transparent. The oil, heated to the boiling-point, should then be added and the mixture boiled until it begins to thicken and form soap. The remainder of the water (also boiling) should then be added and the mixture boiled for about two hours, or until it becomes sufficiently thickened to form cakes of hard soap on cooling. The black, free from any lumps, should then be added and thoroughly mingled by stirring while the mixture is still boiling. The composition thus formed may then be turned into molds and allowed to cool.

In using the above-named composition the harness should first be dusted, and then the composition applied in the usual way with a sponge and water. When the harness is dry it should be rubbed with a dry cloth until a polish results.

By the use of the above composition the harness is speedily and thoroughly cleansed, is rendered soft and pliable, is covered by a water-proof dressing, which also prevents the black from smutting the hands of the person applying the composition or using the harness, and imparts a durable polish to the leather.

I am aware that compositions consisting of caustic soda, olive-oil, blacking, and water have been used for the same or similar purposes; but I am not aware that shellac has ever been combined with the above ingredients for a like purpose.

What I claim, and desire to secure by Letters Patent of the United States, is—

The herein-described composition of matter, to be used for cleansing and polishing harness, consisting of shellac combined with caustic soda, olive-oil, black, and water, in the proportions specified.

HORACE N. WHEELER.

Witnesses:
NICHOLAS T. ALLEN,
WILLIAM H. POTTER.